(12) United States Patent
Kim (10) Patent No.: US 8,526,073 B2
(45) Date of Patent: Sep. 3, 2013

(54) OPTICAL READING DOCUMENT BOARD, IMAGE READING APPARATUS AND IMAGE FORMING APPARATUS INCLUDING THE IMAGE READING APPARATUS

(75) Inventor: Kyung-rok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 12/861,094

(22) Filed: Aug. 23, 2010

(65) Prior Publication Data

US 2011/0141532 A1 Jun. 16, 2011

(30) Foreign Application Priority Data

Dec. 15, 2009 (KR) ................................ 2009-125038

(51) Int. Cl.
*H04N 1/04* (2006.01)

(52) U.S. Cl.
USPC ........................... 358/474; 358/497; 358/475

(58) Field of Classification Search
USPC ................. 358/474, 497, 488, 448, 475, 509, 358/482, 483
See application file for complete search history.

(56) References Cited

U.S. PATENT DOCUMENTS

| 5,101,099 | A * | 3/1992 | Funada et al. | 250/208.1 |
|---|---|---|---|---|
| 5,408,343 | A * | 4/1995 | Sugiura et al. | 358/520 |
| 5,696,610 | A * | 12/1997 | Imoto | 358/509 |
| 7,180,235 | B2 * | 2/2007 | Gotoh et al. | 313/497 |
| 7,683,380 | B2 * | 3/2010 | Lee et al. | 257/79 |
| 7,714,328 | B2 * | 5/2010 | Miyazawa | 257/59 |
| 2006/0227388 | A1 * | 10/2006 | Proctor | 358/474 |
| 2007/0097463 | A1 * | 5/2007 | Razavi | 358/509 |
| 2007/0115487 | A1 * | 5/2007 | Ide et al. | 358/1.4 |
| 2007/0177233 | A1 * | 8/2007 | Ichikawa et al. | 358/509 |
| 2009/0122359 | A1 * | 5/2009 | Kondo et al. | 358/474 |

FOREIGN PATENT DOCUMENTS

JP 2003-140927 5/2003

* cited by examiner

*Primary Examiner* — Negussie Worku
(74) *Attorney, Agent, or Firm* — Stanzione & Kim, LLP (57) ABSTRACT

An optical reading document board, an image reading apparatus, and an image forming apparatus, the optical reading document board including a platen formed of transparent glass and having a top surface on which a document is placed, and a reflectance reduction layer coated on a bottom surface of the platen and having a refractive index different from a refractive index of the platen.

17 Claims, 5 Drawing Sheets

OPTICAL READING DOCUMENT BOARD, IMAGE READING APPARATUS AND IMAGE FORMING APPARATUS INCLUDING THE IMAGE READING APPARATUS

CROSS-REFERENCE TO RELATED APPLICATIONS

This application claims priority under 35 U.S.C. §119 from Korean Patent Application No. 10-2009-0125038, filed on Dec. 15, 2009, in the Korean Intellectual Property Office, the disclosure of which is incorporated herein in its entirety by reference.

BACKGROUND

1. Field of the Invention

The present general inventive concept relates to an optical reading document board, an image reading apparatus, and an image forming apparatus including the image reading apparatus.

2. Description of the Related Art

In image reading apparatuses, such as copy machines, facsimiles, and scanners, an image sensor reads image information by receiving light reflected from a document, and converts the image information into an electric signal.

Such image reading apparatuses include a light source for generating light, the image sensor for receiving light reflected from a document and converting the light into an electric signal, and a reflector disposed to form an optical path between the light source and the image sensor. Generally, the light source may be a line source, such as a cold cathode fluorescent lamp, or a xenon lamp.

In the image reading apparatuses, the light source is disposed near the document, and thus the light reflected from the document is reflected by an optical reading document board, which is formed of flat glass and on which the document is placed, and is incident again on the document.

As such, when the light reflected from the document is incident again on the document by being reflected by the optical reading document board, illuminance of a portion of the document on which the light is incident again is increased, and thus the document is read to be falsely brighter than it is.

Since a general refractive index of a flat glass plate is about 1.5, reflectance at each interface of the flat glass plate is about 5% and reflectance of the top and bottom surfaces of the flat glass plate is about 10%. Accordingly, the reflectance by the flat glass plate is also about 10%. Thus, by reducing the reflectance at the corresponding interface of the flat glass plate, the secondary reflection may be reduced to a predetermined amount.

Consequently, a method of reducing the secondary reflectance at an optical reading document board is needed to be studied.

SUMMARY

The present general inventive concept provides an optical reading document board that reduces secondary reflectance of light reflected from a document, an image reading apparatus, and an image forming apparatus including the image reading apparatus.

Additional aspects and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an optical reading document board including a platen formed of transparent glass and having a top surface on which a document is placed, and a reflectance reduction layer coated on a bottom surface of the platen and having a refractive index different from a refractive index of the platen.

The foregoing and/or other features and utilities of the present general inventive concept may also be achieved by providing an image reading apparatus including an optical reading document board including a platen formed of transparent glass and having a top surface on which a document is placed, and a reflectance reduction layer coated on a bottom surface of the platen and having a refractive index different from a refractive index of the platen, and an image sensor disposed below the optical reading document board to irradiate light onto the optical reading document board and to read an image of a document by receiving light reflected from the document.

The foregoing and/or other features and utilities of the present general inventive concept may also be achieved by providing an image forming apparatus including an image reading apparatus including an optical reading document board including a platen formed of transparent glass and having a top surface on which a document is placed, and a reflectance reduction layer coated on a bottom surface of the platen and having a refractive index different from a refractive index of the platen, and an image sensor disposed below the optical reading document board to irradiate light onto the optical reading document board and to read an image of a document by receiving light reflected from the document, and a printing unit to print an image of the document read by the image reading apparatus.

The foregoing and/or other features and utilities of the present general inventive concept may also be achieved by providing an optical reading document board usable with an image forming apparatus, including a transparent platen disposed to pass a light beam to read a document, and a reflectance reduction layer disposed on the platen to transmit the light beam in a direction toward the platen and the document, and to transmit a reflected light beam from the document through the platen in a second direction, the reflectance reduction layer having a characteristic different from a characteristic of the platen to reduce reflectance of the reflected light beam which is reflected back to the platen.

The characteristic of the reflectance reduction layer and the platen may be at least one of thickness, material, and refractive index.

The transparent platen may have a first surface to face the reflectance reduction layer and a second surface to face the document, the first direction may be a direction from the first surface to the second surface, the second direction may be a direction from the second surface to the first surface; and the reflectance reduction layer reduces the reflectance of the reflected beam received through the second direction such that the reflected beam is transmitted in the second direction and is prevented from be reflected and transmitted in the first direction.

The reflectance reduction layer may include a layer group having a first layer formed on a surface of the platen and a second layer formed on a surface of the first layer, to transmit the light beam and the reflected light beam, the first layer may have a characteristic different from characteristics of the second layer and the platen, and the second layer may have a characteristic different from the characteristic of the first layer and the platen.

The reflectance reduction layer may include one or more layer groups, each layer group having one or more layers, and each layer may have a characteristic different from a characteristic of the platen and at least one of other layers.

The transparent platen may include glass, and the reflectance reduction layer may include a material having a characteristic of magnesium or fluorine.

The reflectance reduction layer may include a first layer formed with a first material having a characteristic of magnesium and fluorine and a second layer formed with a second material having a characteristic of tantalum and oxide.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
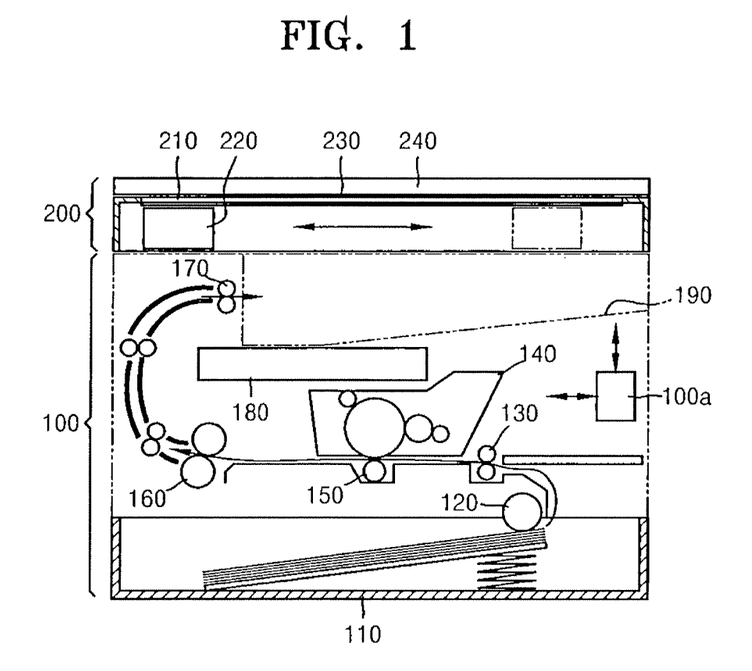
FIG. 1 is a cross-sectional view illustrating an image reading apparatus including an optical reading document board according to an embodiment of the present general inventive concept.
Figure 2:
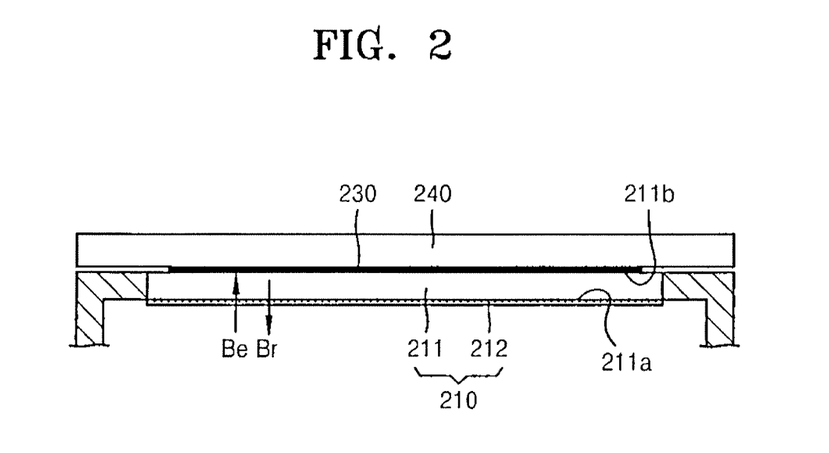
FIG. 2 is a partial enlarged diagram illustrating the image reading apparatus including the optical reading document board of FIG. 1, according to an embodiment of the present general inventive concept.

FIG. 1 is a lateral cross-sectional view illustrating an image forming apparatus including an image reading apparatus 200 including an optical reading document board 210 according to an embodiment of the present general inventive concept, and FIG. 2 is a partial enlarged diagram illustrating the image reading apparatus 200 including the optical reading document board 210 of FIG. 1, according to an embodiment of the present general inventive concept.

Referring to FIGS. 1 and 2, the image forming apparatus includes a printing unit 100, and the image reading apparatus 200 disposed on the printing unit 100.

The printing unit 100 may have the same structure as a printer, and the image forming apparatus may be an electronic photograph type or an inkjet type. FIG. 1 illustrates an electronic photograph type image forming apparatus as an example of the image forming apparatus. The printing unit 100 includes a cassette 110 that stacks at least one sheet of paper and that is detachable from the printing unit 100, a pickup unit 120 that picks up the sheets of paper a sheet at a time, a transport unit 130 that transfers the picked up piece of paper inside the printing unit 100, a developing unit 140 that develops an electrostatic latent image with a developer, a transfer unit 150 that transfers the developed electrostatic latent image onto the transferred sheet of paper, a fixing unit 160 for fusing the transferred electrostatic latent image onto the sheet of paper, a discharge unit 170 that discharges the sheet of paper to a discharge tray 190, and an exposure unit 180 that forms the electrostatic latent image.

The image reading apparatus 200 includes the optical reading document board 210 on which a document 230 is placed, an image sensor 220 that moves back and forth in a direction indicated by an arrow below the optical reading document board 210 and reads an image of the document 230 by irradiating light onto the document 230 and receiving light reflected from the document 230, and a cover 240 that covers the optical reading document board 210.

The optical reading document board 210 is formed of transparent glass so that light may penetrate therethrough, and includes a platen 211 on which the document 230 to be read is placed, and a reflectance reduction layer 212 coated on a bottom surface of the platen 211 to reduce light that is reflected from the document 230 reflecting back to the document 230.

The reflectance reduction layer 212 may be formed of a material having a reflective index lower than a reflective index of the platen 211, and may have a thickness of tens to hundreds of nanometers. The reflectance reducing layer 212 is coated on the bottom surface of the platen 211, and a method of coating the reflectance reducing layer 212 is not limited. Accordingly, any coating method that may be used to form the reflectance reduction layer 212 on the bottom surface of the platen 211 may be used.

The image forming apparatus may include a control unit 100a to control components or units thereof to perform a document reading operation to read a document using the image sensor 220 of the image reading apparatus 200, a printing operation to print an image on the sheet of paper picked-up and fed along a feeding path using the printing unit 100 according to data corresponding to the read document or data received from an external device connectable to the image forming apparatus through a wired or wireless communication, and an image forming or transmitting operation to form an image corresponding to the read document on a display unit of the image forming apparatus or to transmit data of the image corresponding to the read document to an external device connectable to the image forming apparatus through a wired or wireless communication.

The image sensor 220 may have a light emitting unit to emit a light beam Be in a direction toward the document 230 through a first (bottom) surface 211a, a main body, and a second (top) surface 211b of the platen 211, and a light receiving unit to receive the light beam Br reflected by the document 230 through the second (top) surface 211b, the main body, and the first (bottom) surface 211a of the platen 211.

The light beam Br may have a first portion reflected by the document 230 using the light beam Be and a second portion re-reflected back to the document 230 by the reflectance reduction layer 212. When the second portion of the light beam Br is controlled or reduced, the light beam Br may have a maximum of the first portion and a minimum of the second portion such that most of the first portion of the light beam can pass (or transmit) through the reflectance reduction layer 212 directly toward the image sensor 220 with a minimum amount of the second portion which is reflected toward the document. The minimum amount of the second portion may be zero or close to zero, or an amount which does not affect an image of the document 230 sensed by the image sensor 220 with the light beam Br. In this case, an image of the document 230 can be represented by the light beam Br without distortion or overexposure of the re-reflected light beam of the image sensor 220.

The light beam Be of the image sensor 220 may have a first portion to be transmitted through the reflectance reduction layer 212 and the platen 211 toward the document 230, and a second portion to be reflected back toward the image sensor 220. The first portion of the light beam Be may be a maximum amount to reach the document 230, and the second portion of the light beam Be may be a minimum amount to be reflected not toward the document 230 but other area than a desired portion of the document 230 to be scanned. The minimum amount may be zero or close to zero such that most of the first portion of the light beam Be can be transmitted toward the document 230 without interference of the second portion thereof. However, the present general inventive concept is not limited thereto. It is possible that the second portion may be included into the light beam Be such that the document 230 can be scanned and detected by the image sensor 220 as a desirable scanned image with a desirable intensity and resolution according to the light beam Be.

Figure 3A:
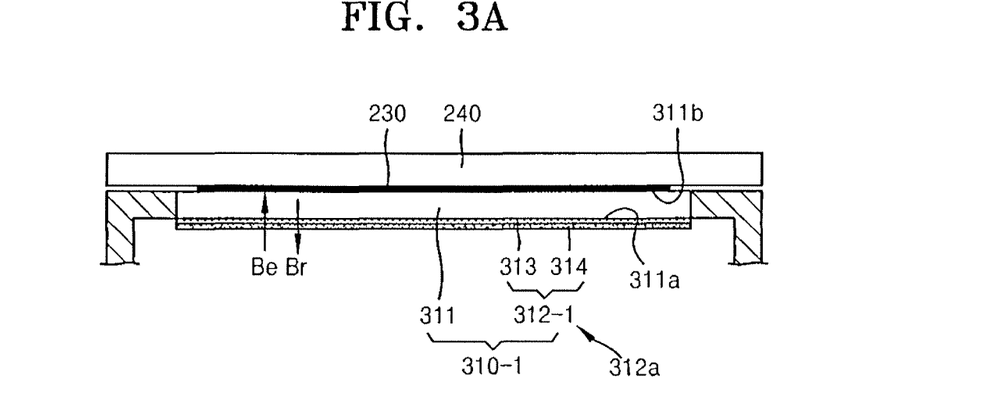
FIGS. 3A, 3B, and 3C are views illustrating an optical reading document board usable with an image forming apparatus according to another embodiment of the present general inventive concept.
Figure 3B:
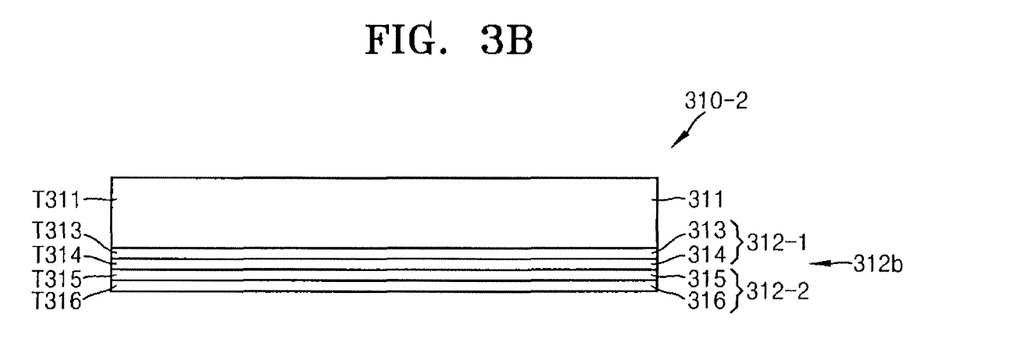
Figure 3C:
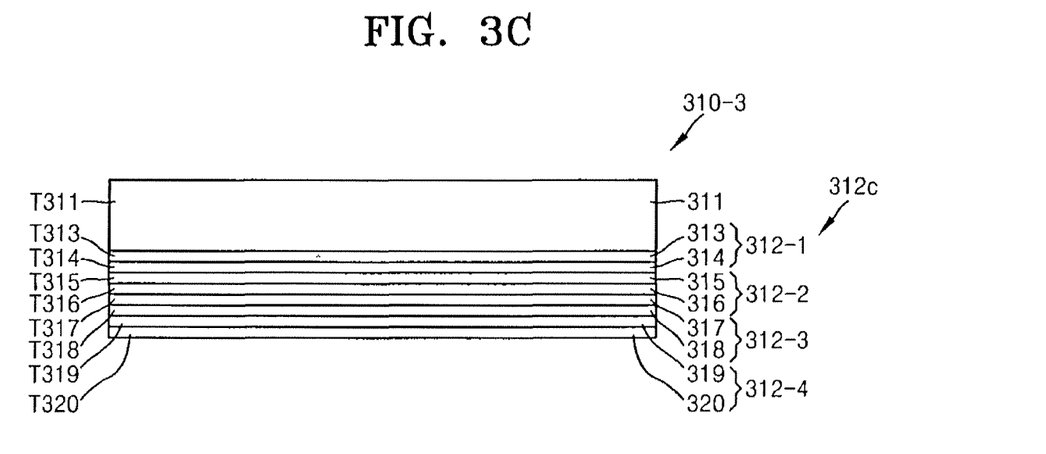

FIGS. 3A, 3B, and 3C are partial enlarged diagrams illustrating the image reading apparatus 200 of FIG. 1 including an optical reading document board 310 (310-1, 310-2, and 310-2, respectively), according to another embodiment of the present general inventive concept.

The optical reading board 310 may include one or more reflectance reduction layers which can have different characteristics in material, thickness, reflectance, refractive index, wavelength range of a light beam to be transmitted or reflected, and so on, such that the amount of the second portion can be minimized not to affect the scanned image of the document 230 detected by the image sensor 220.

Referring to FIG. 3A, the optical reading document board 310 (or 310-1) includes a platen 311, and a reflectance reduction layer 312 (312-1 or 312a) coated on a bottom surface of the platen 311. The reflectance reduction layer 312 may include a first layer 313 and a second layer 314. It is possible that the reflectance reduction layer 312 may include one or more first layer 313 and one or more second layer 314 that are alternately stacked on each other with respect to the platen 311. A refractive index of the first layer 313 is lower than a refractive index of the platen 311, and a refractive index of the second layer 314 is greater than the refractive index of the platen 311. Accordingly, the refractive index of the second layer 314 is greater than the refractive index of the first layer 313. The document 230 is placed on a top surface of the optical reading document board 310, and the cover 240 covers the document 230.

Since the reflectance relates to the refractive index, the reflectance of the reflectance reduction layer 312 may vary according to the refractive index. In this case, the reflectance reduction layer 312 may have a characteristic to control or change the refractive index of the layer of the reflectance reduction layer 312, thereby reducing the reflectance thereof.

The first layer 313 may be formed of magnesium fluoride ($MgF_2$) to have a relatively low reflectance, and the second layer 314 may be formed of tantalum pentoxide ($Ta_2O_5$) to have a relatively high reflectance. The reflectance reduction layer 312 is used to reduce reflectance by the image reading apparatus 200 to 1% or lower in a used wavelength band. The reflectance by the image reading apparatus 200 may be determined according to a function based on refractive indexes of the materials forming the first and second layers 313 and 314 and thicknesses of the first and second layers 313 and 314.

Referring to FIG. 3B, a reflectance reduction layer 312b is formed on a bottom surface of the platen 311 of the optical reading document board 310-2. However, the present general inventive concept is not limited thereto. It is possible that the reflectance reduction layer 312b can be formed or attached to the bottom surface of the platen 311 not to provide a gap between the platen 311 and the reflectance reduction layer 312b. However, it is also possible that the gap may be formed if the gap does not increase the above-described reflection. The reflectance reduction layer 312b may include the first layer 313, the second layer 314, a third layer 315, and a fourth layer 316. The first layer 313 and the second layer 314 may form a first layer group, and the third layer 315 and the fourth layer 316 may form a second layer group. It is possible that one of the two layers of the first group and one of the two layers of the second group may be omitted to form the reflectance reduction layer 312b of the optical reading document board 310-2.

A refractive index of the third layer 315 may be lower than a refractive index of the platen 311, and a refractive index of the fourth layer 316 may be greater than the refractive index of the platen 311. Accordingly, the refractive index of the fourth layer 316 may be greater than the refractive index of the third layer 315. However, the present general inventive concept is not limited thereto. The refractive index thereof may vary. It is possible that the first layer 313 and the third layer 315 may be same, and the second layer 314 and the fourth layer 316 may be same. It is possible that one of the first layer 313 and the second layer 314 may be used as the first layer group, and one of the third layer 315 and the fourth layer 316 can be used as the second layer group.

The platen 211 may have a thickness T311. The first layer 313, second layer 314, third layer 315, and fourth layer 316 may have thicknesses T313, T314, T315, and T316, respectively. The thicknesses T313, T314, T315, and T316 may be same. The thicknesses T313 and T315 may be same, and the thicknesses T314 and T316 may be same. However, it is possible that the thicknesses T313, T314, T315, and T316 may be different from one another. It is also possible that the thickness T315 of the third layer 315 may be thinner than the thickness T313 of the first layer 313, and thickness T316 of the fourth layer 316 may be thinner than the thickness 314 of the second layer 314.

A total thickness of the thicknesses T313, T314, T315, and T316 may be thinner than a thickness T311 of the platen 311. It is possible that a thickness of the first layer group and a thickness of the second layer group may be same. However, it is also possible that a thickness of the first layer group and a thickness of the second layer group may be different from each other.

Referring to FIG. 3C, a reflectance reduction layer 312c is formed on a bottom surface of the platen 311 of the optical reading document board 310-3. However, the present general inventive concept is not limited thereto. It is possible that the reflectance reduction layer 312c can be formed or attached to the bottom surface of the platen 311 not to provide a gap between the platen 311 and the reflectance reduction layer 312-2. However, it is also possible that the gap may be formed if the gap does not increase the above-described reflection. The reflectance reduction layer 312c may include the first layer 313, the second layer 314, the third layer 315, the fourth layer 316, a fifth layer 317, a sixth layer 318, a seventh layer 319, and/or a eighth layer 320. The first layer 313 and the second layer 314 may form a first layer group, the third layer 315 and the fourth layer 316 may form a second layer group, the fifth layer 317 and the sixth layer 318 may form a third layer group, and the seventh layer 319 and the eighth layer 320 may form a fourth layer group. It is possible that one of the two layers of the first layer group, one of the two layers of the second layer group, one of the two layers of the third layer group, and/or one of the two layers of the fourth layer group may be omitted to form the reflectance reduction layer 312c of the optical reading document board 310-3.

A refractive index of at least one of the layers of the respective layer groups may be lower than a refractive index of the platen 311, and a refractive index of the other one of the layers of the respective layer groups may be greater than the refractive index of the platen 311. Accordingly, the refractive index of one of the respective layer groups may be greater than the refractive index of the other one of the respective layer groups. However, the present general inventive concept is not limited thereto. The refractive index thereof may vary. It is possible that at least two layers of the third and fourth layer groups may have a same refractive index. It is possible that one of the fifth layer 317 and the sixth layer 318 may be used as the third layer group, and one of the seventh layer 319 and the eighth layer 320 can be used as the fourth layer group.

The platen 211 may have a thickness T311. The first layer 313, second layer 314, third layer 315, fourth layer 316, fifth layer 317, sixth layer 318, seventh layer 319, and eighth layer 320 may have thicknesses T313, T314, T315, T316, T316, T318, T319, and T320, respectively. The thicknesses T313, T314, T315, T316, T316, T318, T319, and T320 may be same. The thicknesses T313, T315, T317, and T319 may be same, and the thicknesses T314, T316, T318, and T320 may be same. However, it is possible that the thicknesses T313, T314, T315, T316, T316, T318, T319, and T320 may be different from one another. It is also possible that the thickness T317 of the fifth layer 317 may be thinner than the thickness T313 of the first layer 313, and thickness T318 of the sixth layer 318 may be thinner than the thickness 314 of the second layer 314

A total thickness of the thicknesses T313, T314, T315, T316, T316, T318, T319, and T320 may be thinner than a thickness T311 of the platen 311. It is possible that a thickness of the third layer group and/or a thickness of the fourth layer group may be the same as a thickness of the first layer group. However, it is also possible that a thickness of the third layer group and/or a thickness of the fourth layer group may be different from each other.

Figure 4:
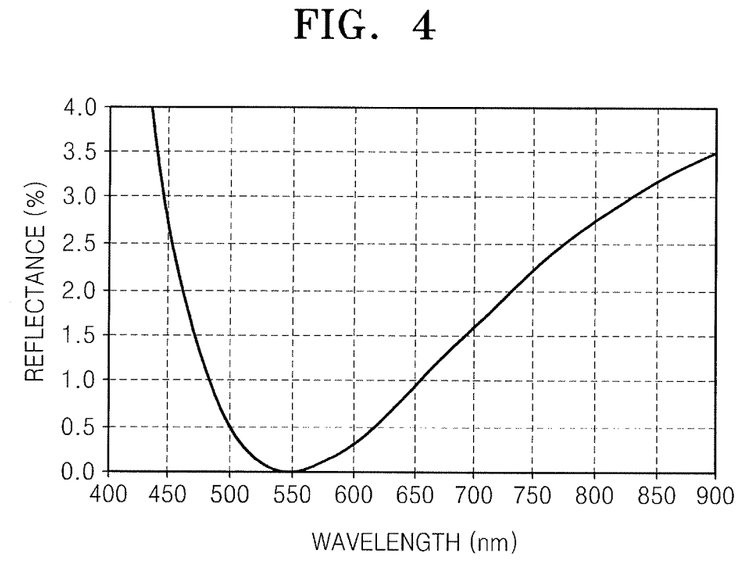
FIG. 4 is a graph illustrating a reflectance reduction rate by using a reflectance reduction layer of FIG. 3, according to an embodiment of the present general inventive concept.
Figure 5:
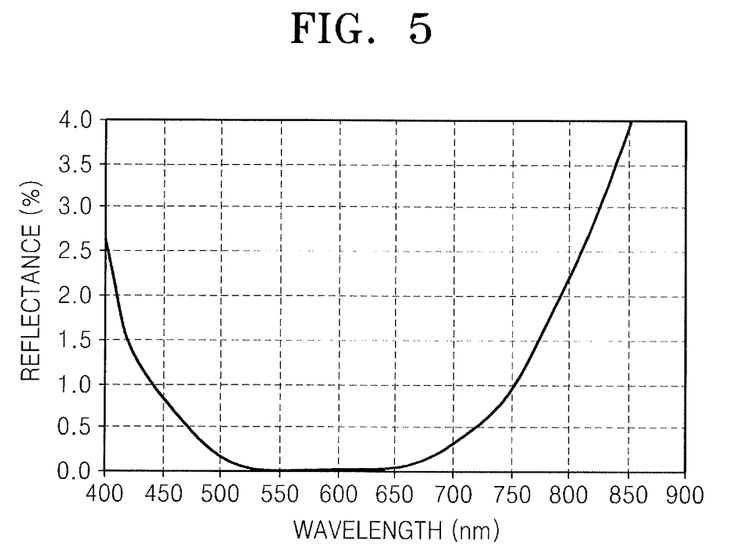
FIG. 5 is a graph illustrating a reflectance reduction rate by using a reflectance reduction layer, according to another embodiment of the present general inventive concept.
Figure 6:
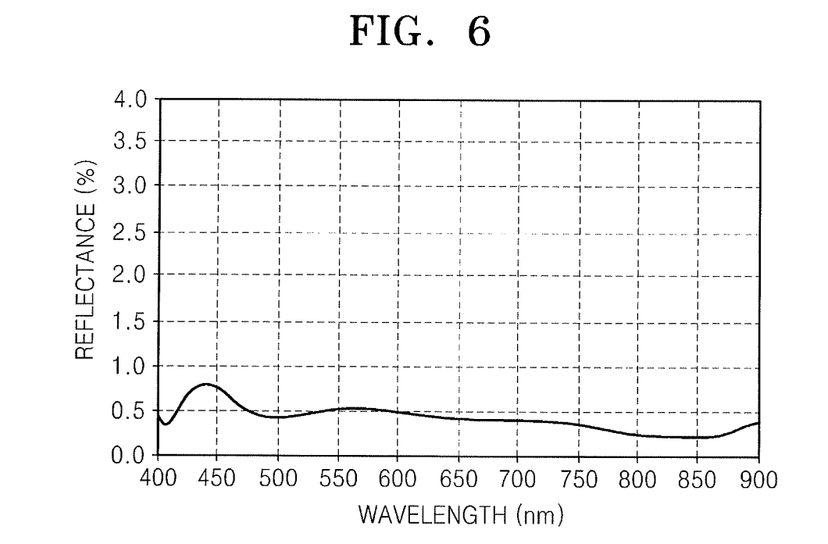
FIG. 6 is a graph illustrating a reflectance reduction rate by using a reflectance reduction layer, according to another embodiment of the present general inventive concept.

FIG. 4 is a graph illustrating a reflectance reduction rate by using the reflectance reduction layer 312 of FIG. 3A, according to an embodiment of the present general inventive concept, FIG. 5 is a graph illustrating a reflectance reduction rate by using a reflectance reduction layer 312-2 of FIG. 3B, according to another embodiment of the present general inventive concept, and FIG. 6 is a graph illustrating a reflectance reduction rate by using a reflectance reduction layer 312-3 of FIG. 3C, according to another embodiment of the present general inventive concept.

Referring to FIG. 4, the reflectance by the image reading apparatus 200 is measured while the first and second layers 313 and 314 of the reflectance reduction layer 312 and the platen 311 are as described in Table 1.

TABLE 1

| | Material | Refractive Index | Thickness (μm) |
|---|---|---|---|
| First Layer | MgF$_2$ | 1.3826 | 0.31960000 |
| Second Layer | Ta$_2$O$_5$ | 2.1409 | 0.06181000 |
| Platen | Glass | 1.5185 | |

Referring to Table 1 and FIG. 4, the reflectance by the image reading apparatus 200 is 1% or lower in a wavelength range from about 480 μm to about 650 μm when the refractive index of the first layer 313 is lower than the refractive index of the second layer 314 and the thickness of the first layer 313 is greater than the thickness of the second layer 314.

The reflectance reduction layer of FIG. 5 is formed by alternately disposing the first and second layers 313 and 314 and the third and fourth layers 315 and 36 as illustrated in FIG. 3B, and the reflectance by the image reading apparatus 200 is measured when the first and second layers 313 and 314 each disposed twice, as first through fourth layers, and a platen are as described in Table 2.

TABLE 2

| | Material | Refractive Index | Thickness (μm) |
|---|---|---|---|
| First Layer | MgF$_2$ | 1.3826 | 0.25000000 |
| Second Layer | Ta$_2$O$_5$ | 2.1409 | 0.50000000 |
| Third Layer | MgF$_2$ | 1.3826 | 0.06960000 |
| Fourth Layer | Ta$_2$O$_5$ | 2.1409 | 0.06181000 |
| Platen | Glass | 1.5185 | |

Referring to Table 2 and FIG. 5, the reflectance by the image reading apparatus 200 is 1% or lower in a wavelength range from about 450 μm to about 750 μm when the refractive index of the first layer is lower than the refractive index of the second layer, the thickness of the second layer is greater than the thickness of the first layer, and the thicknesses of the third and fourth layers are less than the thickness of the first layer.

The reflectance reduction layer of FIG. 6 is formed by alternately disposing the first and second layers 313 and 314, the third and fourth layers 315 and 316, the fifth and sixth layers 317 and 318, and the seventh and eighth layers 319a and 319b, as illustrated in FIG. 3C, and the reflectance by the image reading apparatus 200 is measured when the first through eighth layers 313 through 319b are disposed as illustrated in FIG. 3C, and a platen are as described in Table 3.

TABLE 3

| | Material | Refractive Index | Thickness (μm) |
|---|---|---|---|
| First Layer | MgF$_2$ | 1.3826 | 0.27923680 |
| Second Layer | Ta$_2$O$_5$ | 2.1409 | 0.11724830 |
| Third Layer | MgF$_2$ | 1.3826 | 0.04464248 |
| Fourth Layer | Ta$_2$O$_5$ | 2.1409 | 0.36027620 |
| Fifth Layer | MgF$_2$ | 1.3826 | 0.04516664 |
| Sixth Layer | Ta$_2$O$_5$ | 2.1409 | 0.13686080 |
| Seventh Layer | MgF$_2$ | 1.3826 | 0.10898960 |
| Eighth Layer | Ta$_2$O$_5$ | 2.1409 | 0.04982326 |
| Platen | Glass | 1.5185 | |

Referring to Table 3 and FIG. 6, the reflectance of the image reading apparatus 200 is 1% or lower in a wavelength range from about 400 μm to about 900 μm.

Accordingly, as shown in Tables 1 through 3, by setting thicknesses of layers of a reflectance reduction layer to be different, reflectance by the image reading apparatus 200 for a given wavelength of light may be 1% or lower. Materials and thicknesses of the layer of the reflectance reduction layer may be selected in such a way that the reflectance by the image reading apparatus 200 for a wavelength of light to be used may be 1% or lower. The materials of the layers of the reflectance reduction layer are not limited to those shown in Table 1 through 3, and may vary.

Meanwhile, a top surface of the platen 211 (that is, a surface on which the document 230 is placed) of the optical reading document board 210 also secondary reflects light, but the secondary reflection by the top surface of the platen 211 does not cause diffusion of image concentration because a gap between the document 230 and the platen 211 is small since the document 230 is placed against the platen 211. Accordingly, in terms of costs, the reflectance reduction layer 212 may be disposed only on the bottom surface of the platen 211 so as to reduce the secondary reflectance by the image reading apparatus 200.

Figure 7:
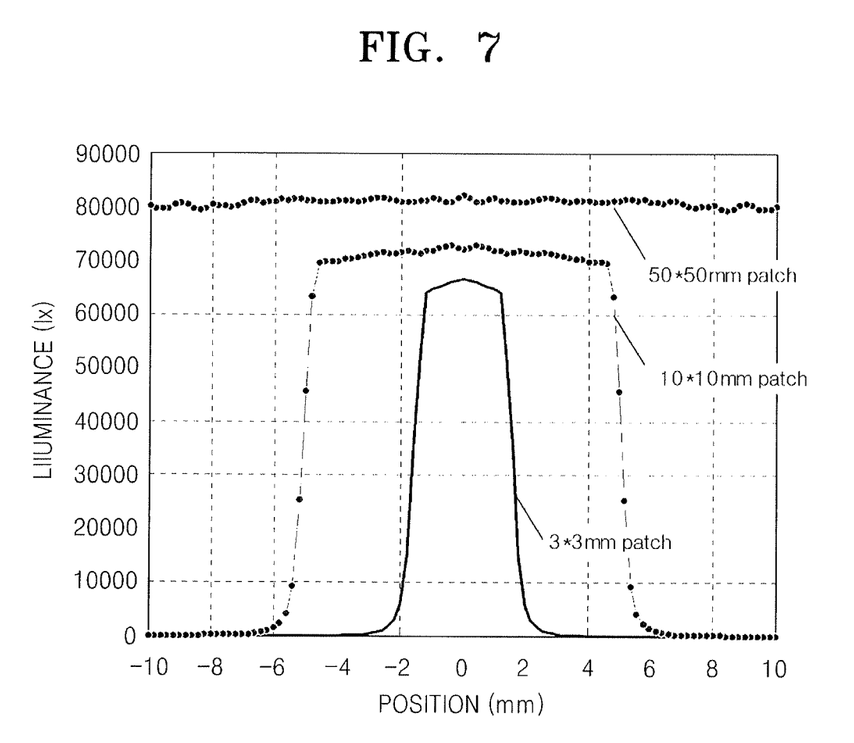
FIG. 7 is a graph illustrating results of simulating read image characteristics according to sizes of white documents on an optical reading document board without a reflectance reducing layer.
Figure 8:
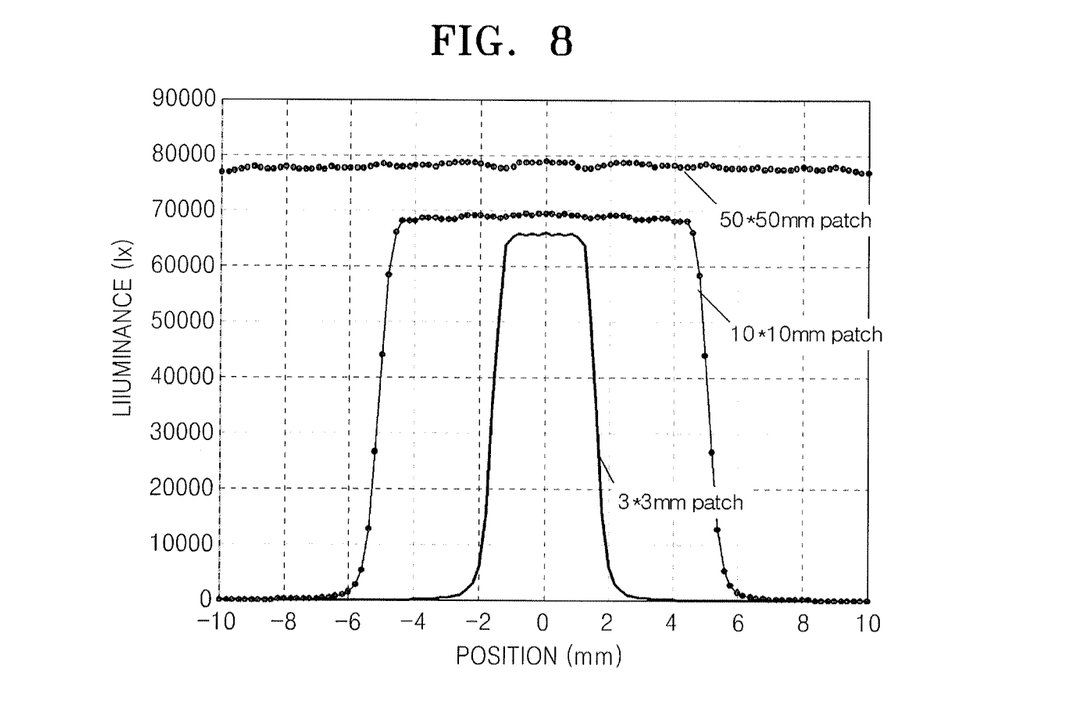
FIG. 8 is a graph illustrating results of simulating read image characteristics according to sizes of white documents on an optical reading document board including a reflectance reducing layer according to an embodiment of the present general inventive concept.
Figure 9:
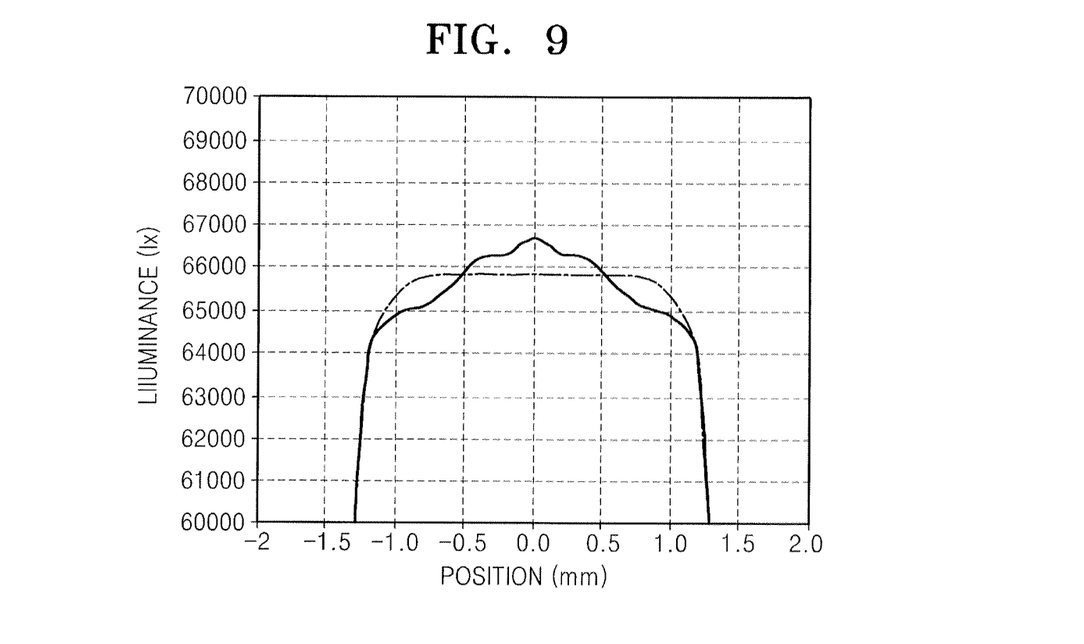
FIG. 9 is a graph illustrating illuminance gradient characteristics of 3×3 mm patches shown in FIGS. 7 and 8.

FIG. 7 is a graph showing results of simulating read image characteristics according to sizes of white documents on an optical reading document board without a reflectance reducing layer, FIG. 8 is a graph showing results of simulating read image characteristics according to sizes of white documents on an optical reading document board including a reflectance reducing layer according to an embodiment of the present general inventive concept, and FIG. 9 is a graph for comparing illuminance gradient characteristics of a 3×3 mm patch shown in FIGS. 7 and 8.

Referring to FIGS. 7 through 9, illuminance of a 50×50 mm patch or a 10×10 mm patch is lower when the reflectance reduction layer is used as shown in FIG. 8 than when the reflectance reduction layer is not used as shown in FIG. 7. Specifically, as shown in FIG. 9, illuminance of the 3×3 mm patch is remarkably lowered when the reflectance reduction layer is used.

Considering that an illuminance difference decreases according to the size of a white document patch as secondary reflectance decreases, the quality of an image is increased by disposing the reflectance reduction layer below a platen.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. An optical reading document board comprising:
    a platen formed of transparent glass and having a top surface on which a document is placed;
    an optical sensor having a light emitting unit to transmit a light beam toward the platen, the optical sensor to detect a reflected light beam from the document through the platen; and
    a reflectance reduction layer coated on a bottom surface of the platen, wherein the reflectance reduction layer comprises one or more first layers and one or more second layers alternately stacked in multiple layers, and wherein the first layer has a refractive index that is less than a refractive index of the platen, and the second layer has a refractive index that is greater than the refractive index of the platen.

2. The optical reading document board of claim 1, wherein the first and second layers have different thicknesses.

3. The optical reading document board of claim 1, wherein the first layer is formed of magnesium fluoride ($MgF_2$), and the second layer is formed of tantalum pentoxide ($Ta_2O_5$).

4. The optical reading document board of claim 1, wherein the reflectance reduction layer is configured to reduce reflectance to 1% or below.

5. The optical reading document board of claim 1, wherein the reflectance is determined based on a function of refractive indexes of materials forming the reflectance reduction layer and thicknesses of the reflectance reduction layer.

6. An image reading apparatus comprising:
    an optical reading document board comprising a platen formed of transparent glass and having a top surface on which a document is placed, and a reflectance reduction layer coated on a bottom surface of the platen, wherein the reflectance reduction layer comprises one or more first layers and one or more second layers alternately stacked in multiple layers, and wherein the first layer has a refractive index that is less than a refractive index of the platen, and the second layer has a refractive index that is greater than the refractive index of the platen; and
    an image sensor disposed below the optical reading document board and having a light emitting unit to irradiate light toward the document, wherein the document is read by receiving, by the image sensor, light reflected from the document.

7. The image reading apparatus of claim 6, wherein the first and second layers have different thicknesses.

8. The image reading apparatus of claim 6, wherein the first layer is formed of $MgF_2$, and the second layer is formed of $Ta_2O_5$.

9. The image reading apparatus of claim 6, wherein the reflectance reduction layer is configured to reduce reflectance to 1% or below.

10. The image reading apparatus of claim 6, wherein the reflectance is determined according to a function based on refractive indexes of materials forming the reflectance reduction layer and thicknesses of the reflectance reduction layer.

11. An image forming apparatus comprising:
    an image reading apparatus comprising:
        an optical reading document board comprising a platen formed of transparent glass and having a top surface on which a document is placed, and a reflectance reduction layer coated on a bottom surface of the platen, wherein the reflectance reduction layer comprises one or more first layers and one or more second layers alternately stacked in multiple layers, wherein the first layer has a refractive index that is less than a refractive index of the platen, and the second layer has a refractive index that is greater than the refractive index of the platen, and
        an image sensor disposed below the optical reading document board and having a light emitting unit to irradiate light toward the document, wherein an image of the document is read by receiving, by the image sensor, light reflected from the document; and
    a printing unit to print the image of the document read by the image reading apparatus.

12. An optical reading document board usable with an image forming apparatus, comprising:

a transparent platen disposed to pass a light beam to read a document; and a reflectance reduction layer disposed on the platen to transmit the light beam in a direction toward the platen and the document, and to transmit a reflected light beam from the document through the platen in a second direction, the reflectance reduction layer having a characteristic different from a characteristic of the platen to reduce reflectance of the reflected light beam which is reflected back to the platen, wherein the transparent platen comprises a first surface to face the reflectance reduction layer and a second surface to face the document;

the first direction is a direction from the first surface to the second surface;

the second direction is a direction from the second surface to the first surface; and the reflectance reduction layer reduces the reflectance of the reflected beam received through the second direction such that the reflected beam is transmitted in the second direction and is prevented from being reflected and transmitted in the first direction.

13. The optical reading document board of claim 12, wherein the characteristic of the reflectance reduction layer and the platen is at least one of thickness, material, and refractive index.

14. The optical reading document board of claim 12, wherein:

the reflectance reduction layer comprises a layer group having a first layer formed on a surface of the platen and a second layer formed on a surface of the first layer, to transmit the light beam and the reflected light beam;

the first layer has a characteristic different from characteristics of the second layer and the platen; and the second layer has a characteristic different from the characteristic of the first layer and the platen.

15. The optical reading document board of claim 12, wherein:

the reflectance reduction layer comprises one or more layer groups, each layer group having one or more layers; and each layer has a characteristic different from a characteristic of the platen and at least one of other layers.

16. The optical reading document board of claim 12, wherein:

the transparent platen comprises glass; and the reflectance reduction layer comprises a material having a characteristic of magnesium or fluorine.

17. The optical reading document board of claim 12, wherein:

the reflectance reduction layer comprises a first layer formed with a first material having a characteristic of magnesium and fluorine and a second layer formed with a second material having a characteristic of tantalum and oxide.

\* \* \* \* \*